Feb. 26, 1935.  H. N. HACKETT  1,992,824
MERCURY BOILER
Filed Dec. 30, 1933
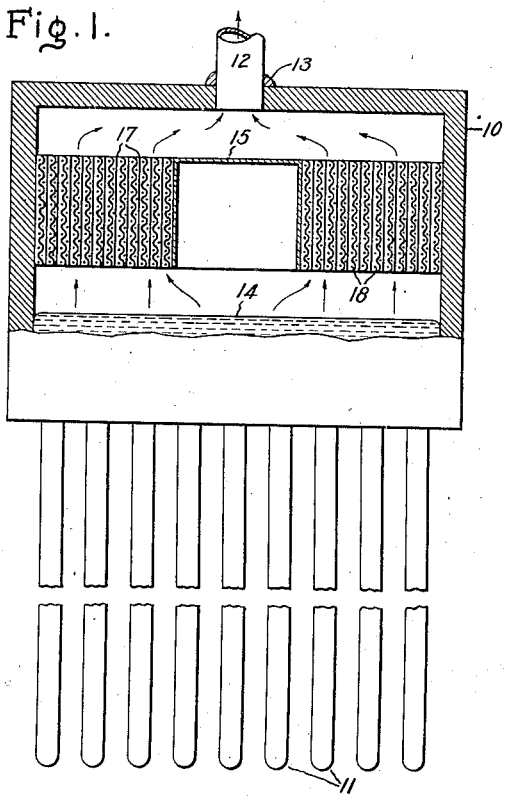
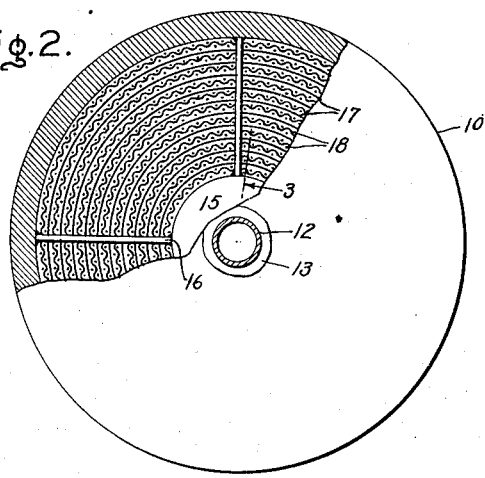
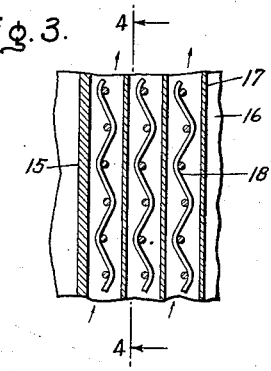
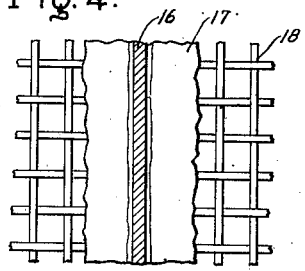
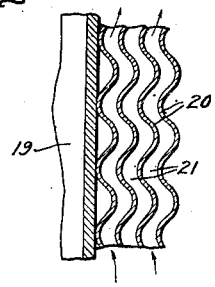
Inventor:
Harold N. Hackett,
by Harry E. Dunham
His Attorney.

Patented Feb. 26, 1935

1,992,824

UNITED STATES PATENT OFFICE 1,992,824

MERCURY BOILER

Harold N. Hackett, Ballston Lake, N. Y., assignor to General Electric Company, a corporation of New York Application December 30, 1933, Serial No. 704,678

2 Claims. (Cl. 122—491)

The present invention relates to mercury boilers, that is, containers or vessels comprising drums and tubes for containing mercury to be heated and evaporated, and means for discharging mercury vapor from the drums. During the operation of present day mercury boilers the mercury liquid is circulated from the drum through tubes in which it is heated and partly evaporated. The mixture of liquid and vapor is returned to the drums at considerable velocity. Due to this high velocity at which the mixture of liquid mercury and vapor is forced into the drum, precaution has to be taken to prevent the liquid from being carried along with the vapor and discharged through the discharge conduit.

The object of my invention is to provide an improved construction and arrangement whereby a mixture of liquid mercury and vapor is effectively separated before the vapor is discharged from the drum.

For a consideration of what I believe to be novel and my invention, attention is directed to the following description and the claims appended thereto in connection with the accompanying drawing.

In the drawing, Fig. 1 represents a somewhat diagrammatic view of a mercury boiler embodying my invention; Fig. 2 is a top view partly broken away of Fig. 1; Fig. 3 shows an enlarged view along line 3 of Fig. 2; Fig. 4 is a view along lines 4—4 of Fig. 3; and Fig. 5 illustrates a modification of my invention.

The mercury boiler comprises a drum 10, in the present instance shown as having an annular cross-section. A lower or bottom portion of the drum is connected to a plurality of tubes 11 which receive mercury liquid from the drum and discharge a mixture of liquid and vapor to the drum. An upper portion, in the present instance a central portion of the head is connected to a vapor discharge conduit 12 fastened to the drum by welds 13. The lower portion of the drum space defines a liquid space for containing mercury liquid 14 and the upper portion of the drum space defines a vapor space. This is the usual type of mercury boiler. Its details and its operation are more fully described in the application of W. L. R. Emmet and B. P. Coulson, Serial No. 306,486, filed September 17, 1928. As stated above, the mixture of mercury liquid and vapor is supplied to the drum space at considerable velocity whereby the vapor may carry liquid particles along and discharge them through the discharge conduit. These liquid particles have an injurious effect when they are discharged, for example, into a turbine, and they also reduce the economy and efficiency of the arrangement.

In accordance with my invention I provide means located in the drum, between tubes for supplying a mixture of liquid and vapor to the drum and the vapor discharge conduit which serves as a separator to prevent liquid particles from being discharged through the latter. From another viewpoint, I provide liquid vapor separating means in the path of the vapor on its flow to the vapor discharge conduit. The separating means in the present example is located in the vapor space of the drum and comprises an inverted cup or cylindrical body 15 having a bottom portion located adjacent the discharge conduit 12 and being held in its position by a plurality of radial struts, or baffles, or webs 16 or like supporting means. A plurality of sheets of metal 17 concentrically spaced apart are welded or fastened to the struts and a screen of wire mesh 18 fastened to the struts is interposed between each pair of adjacent metal sheets 17. The screens, together with the metal sheets, form a plurality of annular, narrow paths into which the mixture of vapor and liquid flows. During operation the narrow paths permit flow of vapor therethrough and at the same time form an obstruction to the flow of liquid. The liquid particles carried along with the vapor impinge on the walls of the sheet metal and the wires of the screen where they collect to finally flow back along the sheet metal and the wire mesh into the liquid space.

In Fig. 5 I have shown a modified liquid separating device comprising a member 19 which corresponds to member 15 of Figs. 1 to 3 and a plurality of corrugated sheets of metal 20 uniformly spaced apart to define winding paths 21 into which the mixture of liquid and vapor flows on its path from the liquid space to the discharge conduit. The liquid particles, due to their high velocity and their considerable inertia, collide with the curved walls of the corrugated sheet metal on which they collect and flow back into the liquid space.

With my invention I have accomplished a simple and reliable liquid vapor separating device which readily removes liquid particles contained in vapor to be discharged from the drum or drums of a mercury boiler.

What I claim as new and desire to secure by Letters Patent of the United States, is:

1. In a mercury boiler, a drum, a plurality of tubes connected to the drum for heating mercury liquid and discharging it into the drum, a vapor discharge conduit connected to an upper portion of the drum, and a liquid vapor separator for removing particles of liquid from the vapor to be discharged through the discharge conduit, said separator comprising a plurality of substantially uniformly spaced sheets of metal and screens of wire mesh defining a plurality of narrow paths for the vapor flowing towards the discharge conduit.

2. In a mercury boiler, a drum, a plurality of tubes connected to the bottom of the drum for discharging a mixture of liquid and vapor into the drum, a vapor discharge conduit connected to the head of the drum, a liquid vapor separating device interposed between the bottom and the head of the drum to prevent liquid particles from being carried along with the vapor into the discharge conduit, said separating device comprising a cylindrical body having a bottom adjacent the discharge conduit and being concentrically spaced from the walls of the drum, a plurality of concentrically spaced sheets of metal defining a plurality of concentric, annular paths between the cylindrical body and the wall of the drum, and means for supporting the device on the walls of the drum.

HAROLD N. HACKETT.